(12) United States Patent
Robustelli

(10) Patent No.: US 12,277,086 B2
(45) Date of Patent: *Apr. 15, 2025

(54) PORT-SHARING SUBSYSTEMS FOR COMPUTING DEVICES

(71) Applicant: ZEBRA TECHNOLOGIES CORPORATION, Lincolnshire, IL (US)

(72) Inventor: Michael Robustelli, Smithtown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/401,264

(22) Filed: Dec. 29, 2023

(65) Prior Publication Data

US 2024/0134812 A1    Apr. 25, 2024

Related U.S. Application Data

(63) Continuation of application No. 17/542,059, filed on Dec. 3, 2021, now Pat. No. 11,860,809.

(51) Int. Cl.
*G06F 13/40* (2006.01)
*G06F 13/42* (2006.01)

(52) U.S. Cl.
CPC ...... *G06F 13/4068* (2013.01); *G06F 13/4022* (2013.01); *G06F 13/4282* (2013.01); *G06F 2213/0042* (2013.01)

(58) Field of Classification Search
None
See application file for complete search history.

(56) References Cited

U.S. PATENT DOCUMENTS 11,061,457 B1 *  7/2021  Bhattacharjee ....... G06F 1/3215
2021/0182225 A1 *  6/2021  Kapron ................... G06F 3/023

* cited by examiner

*Primary Examiner* — Farley Abad
*Assistant Examiner* — Dayton Lewis-Taylor

(57) ABSTRACT

A computing device includes: a housing defining an exterior of the computing device; a controller supported within the housing; a first communication port disposed on the exterior; a second communication port disposed on the exterior; a port-sharing subsystem supported within the housing, having (i) a first state to connect the controller with the first communication port, exclusive of the second communication port, and (ii) a second state to connect the controller with the first communication port and the second communication port; the controller configured to: detect engagement of an external device with the first communication port; obtain connection parameters from the external device; based on the connection parameters, set the port-sharing subsystem in either the first state or the second state; and establish a connection to the external device via the port-sharing subsystem and the first communication port.

6 Claims, 8 Drawing Sheets

PORT-SHARING SUBSYSTEMS FOR COMPUTING DEVICES

RELATED APPLICATION

This U.S. patent arises from a continuation of U.S. application Ser. No. 17/542,059, filed Dec. 3, 2021, which is hereby incorporated herein by reference.

BACKGROUND

Computing devices can be provided with multiple external ports, e.g., USB ports. Such ports can be used to connect peripheral devices, or the like. Some computing devices, however, provide internal hardware resources for a smaller number of ports than the available external ports.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
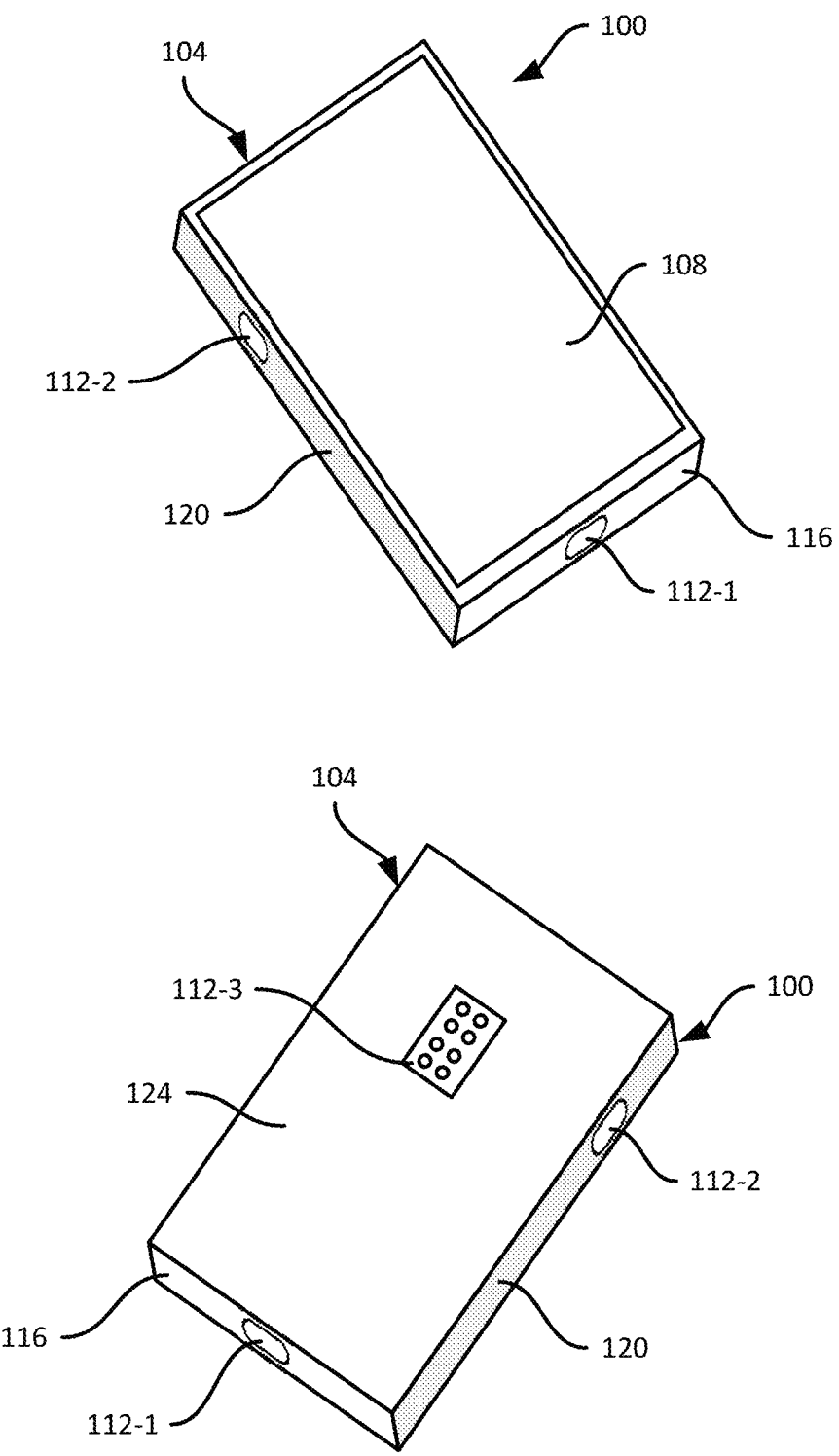
FIG. 1 is a diagram illustrating an example mobile computing device, from the front and the back.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device, comprising: a housing defining an exterior of the computing device; a controller supported within the housing; a first communication port disposed on the exterior; a second communication port disposed on the exterior; a port-sharing subsystem supported within the housing, having (i) a first state to connect the controller with the first communication port, exclusive of the second communication port, and (ii) a second state to connect the controller with the first communication port and the second communication port; the controller configured to: detect engagement of an external device with the first communication port; obtain connection parameters from the external device; based on the connection parameters, set the port-sharing subsystem in either the first state or the second state; and establish a connection to the external device via the port-sharing subsystem and the first communication port.

Additional examples disclosed herein are directed to a method, comprising: detecting engagement of an external device with a first communication port disposed on an exterior of a computing device; obtaining connection parameters from the external device; based on the connection parameters, setting a port-sharing subsystem in either (i) a first state to connect the controller with the first communication port, exclusive of a second communication port disposed on the exterior, or (ii) a second state to connect the controller with the first communication port and the second communication port; and establishing a connection to the external device via the port-sharing subsystem and the first communication port.

FIG. 1 illustrates a computing device 100 viewed from a front (upper portion of FIG. 1), and from a back thereof (lower portion of FIG. 1). The computing device 100 (also referred to herein simply as the device 100) can be a mobile computing device, such as a smart phone, a tablet computer, a wearable computing device, or the like. In other examples, the computing device need not be mobile. The device 100 includes a housing 104 defining an exterior of the device 100, and containing or otherwise supporting various components of the device 100.

As illustrated in FIG. 1, the housing 104 supports a display 108 of the device 100, e.g., controllable by one or more internal components of the device 100 to render text, graphics and the like thereon. The device 100 can also include an input device, such as a touch screen integrated with the display 108. In other examples, the device 100 can include other input devices, in addition to or instead of the above-mentioned touch screen.

The device 100 includes a plurality of communication ports, also referred to herein simply as ports. The illustrated example includes a first communication port 112-1 disposed on a bottom 116 of the device 100, as well as a second communication port 112-2 disposed on a side 120 of the device 100, and a third communication port 112-3 disposed on a back 124 of the device 100. The ports 112-1, 112-2, and 112-3 are also referred to collectively herein as the ports 112, and any one of the ports 112 may also be referred to generically as a port 112. In other examples, the device 100 can include a greater number of ports 112, or as few as two ports 112.

As seen in FIG. 1, the port 112 are disposed on the exterior of the device 100, and enable connections to be established between the device 100 and other electronic devices, also referred to as external devices. A wide variety of such other devices can be connected with the device 100 via the ports 112. Examples of such other devices include peripherals such as a headset (e.g., including one or more speakers and/or one or microphones), a heads-up display (HUD), e.g., mounted on an eyeglass frame, a storage device such as a thumb drive, and the like. Further examples of such other devices include a host computing device, such as a personal computer, to which the device 100 can be connected to transfer files between the personal computer and the device 100, to manage configuration settings of the device 100, and the like.

The connections mentioned above are implemented via a common communication protocol, or set of related communication protocols. In the present example, the connections are Universal Serial Bus (USB) connections. The ports 112 are therefore USB ports, although the ports 112 can have distinct physical configurations and support distinct operational modes, some of which may enable more restricted sets of functionality than others.

For example, in the embodiment illustrated in FIG. 1, the ports 112-1 and 112-2 are USB type-C ports configured to accept type-C connectors on the above-mentioned external devices, or cables connected thereto. The port 112-3 includes a set of contact pads (e.g., eight, in the illustrated example) configured to engage with a corresponding set of pogo pins or other suitable electrical contacts on an external device. Other physical configurations can also be deployed for one or more of the ports 112, as will be apparent to those skilled in the art.

Figure 2:
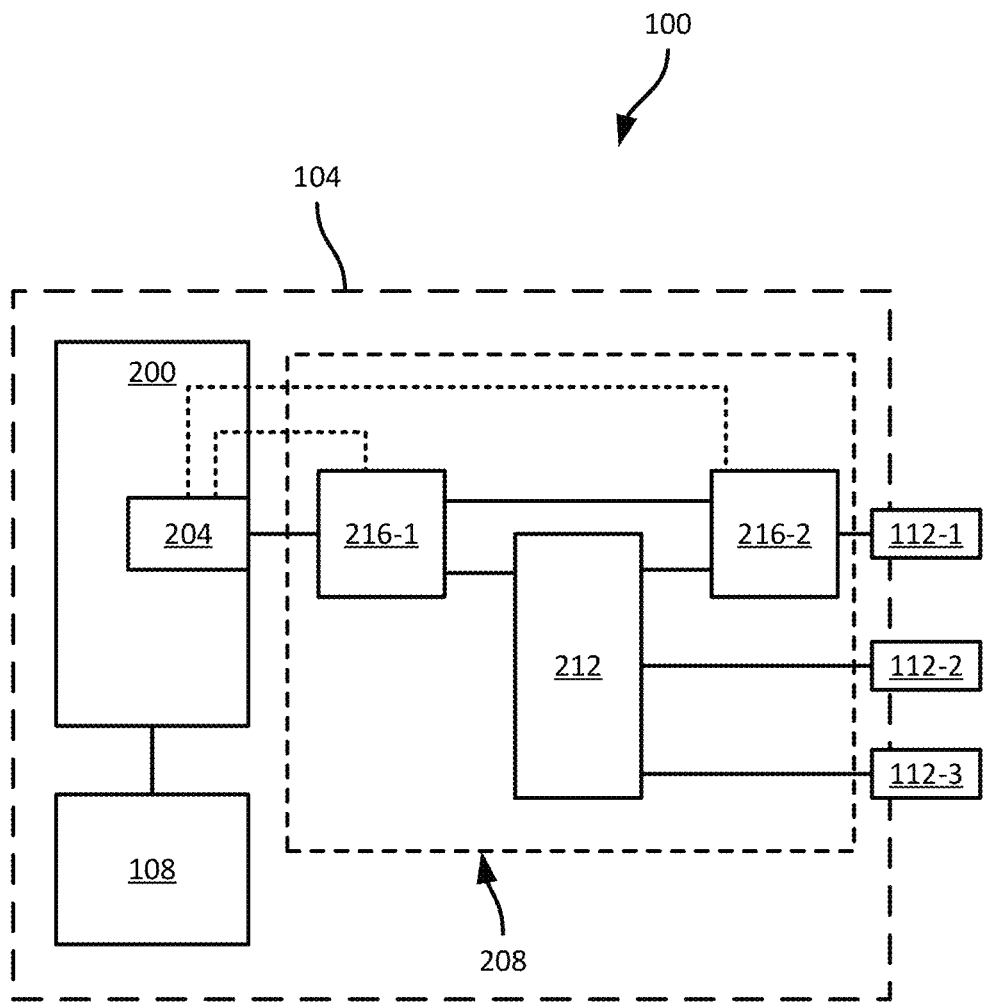
FIG. 2 is a diagram illustrating certain example internal components of the mobile computing device of FIG. 1.

Turning to FIG. 2, certain internal components of the device 100 are illustrated. In particular, the device 100 includes a System on a Chip (SoC) 200, e.g., an integrated circuit or set of integrated circuits deployed in a common package. The SoC 200 can include a central processing unit (CPU), graphics processing unit (GPU), and memory (e.g., a suitable combination of volatile and/or non-volatile memory). The SoC 200 can also include other components such as wireless transceivers or other networking hardware, input/output controllers (e.g., for the touch screen integrated with the display 108), and the like. In other examples, some or all of the above mentioned components can be implemented as discrete integrated circuits, rather than being integrated into the SoC 200.

The device 100 also includes a controller 204 configured to establish connections with external devices via the ports 112 and manage the exchange of data between such external devices and the device 100 itself. In the present example, in which the ports 112 are USB ports, the controller 204 is a USB controller configured to manage the above-mentioned connections and enable data transfer between external devices and the CPU and/or other components of the device 100. In some examples, as with the other components mentioned above, the controller 204 can be implemented as a discrete component rather than integrated with the SoC 200.

In the present example, although the device 100 includes three ports 112, the controller 204 implements a single logical port (e.g., the controller 204 may include only a single set of pins implementing the above-mentioned port). The ports 112, in other words, share access to the single internal port implemented by the controller 204. In other devices, a multi-port controller may be provided, or a plurality of single-port controllers may be provided. The cost and/or manufacturing complexity of such devices may be increased as a result, however. The inclusion of a comparatively simple controller 204 in the device 100 may reduce cost and/or complexity. Sharing access to the internal port implemented by the controller 204 between the multiple external ports 112, however, can lead to interrupted connections at one or more of the ports 112, reduced functionality at the ports 112, or the like. The device 100, for example the controller 204 in particular, is therefore configured to implement functionality to mitigate such interruptions, as will be discussed below in greater detail.

In order to physically interconnect the ports 112 with the controller 204, the device 100 includes a port-sharing subsystem 208. The port-sharing subsystem includes a hub 212 (e.g., a USB hub, in this example). The hub 212 enables physical connections between the controller 204 and each of the ports 112. The hub 212 therefore enables concurrent use of one or more of the ports 112, sharing the available bandwidth of the single internal port implemented by the controller 204 between any active ports 112 (i.e., ports 112 that are currently engaged with external devices).

However, as will be apparent to those skilled in the art, the hub 212, and/or certain combinations of the hub 212 and ports 112, may not support a complete set of operational modes enabled by the controller 204. In the context of USB connections, for example, the controller 204 may allow connections to be established with external devices with the relevant port 112 acting as either a downstream-facing port (DFP, in which the device 100 is a host device, e.g., for a peripheral such as a headset) or an upstream-facing port (UFP, in which the device 100 is a client and the external device is a host). Further, the controller 204 may support operational modes with various different transfer speeds. For example, the controller 204 may support USB SuperSpeed (SS) connections, as well as high speed (HS) connections with lower bandwidth the SS connections, and full speed (FS) connections with lower bandwidth than HS connections.

The hub 212, on the other hand, may enable only DFP connections to external devices, in which the device 100 is a host device. Further, the ports 112-2 and 112-3, e.g., due to their pinouts or other restrictions, may support only reduced transfer speeds (e.g., FS and HS, but not SS). The port 112-1, meanwhile, may be a dual-role port (DRP, i.e., configurable as either DFP or UFP) supporting the full set of functionality enabled by the controller 204, but only when not connected via the hub 212 (which would otherwise restrict the port 112-1 to DFP operation). Similarly, some transfer speeds (e.g., SS) may be unavailable to the port 112-1 via the hub 212. The port 112-1 may therefore also be referred to as an enhanced port, while the ports 112-2 and 112-3 may also be referred to as restricted ports. As will be seen below, the port-sharing subsystem 208 has enhanced and restricted states that determine the capabilities available via the ports 112.

To enable the port 112-1 to establish UFP connections, connections employing certain transfer speeds, or the like, the port-sharing subsystem 208 also includes at least one switch 216. In the present example, the port-sharing subsystem 208 includes a first switch 216-1, and a second switch 216-2. The switches 216 can be implemented as distinct components, or as portions of a single component, such as a multiplexer or the like. The switches 216 are controllable by the controller 204, as indicated by the dotted lines in FIG. 2. As seen in FIG. 2, the switch 216-1 enables connection of the controller 204 to either the hub 212, or the second switch 216-2. The second switch 216-2, meanwhile, enables connection of the port 112-1 to either the hub 212, or the first switch 216-1. Thus, the switches 216 can cooperate to bypass the hub 212 on behalf of the port 112-1, connecting the port 112-1 directly to the controller 204.

Direct connection of the port 112-1 to the controller 204 via the switches 216 excludes connections between the controller 204 and the ports 112-2 and 112-3. Therefore, subsequent connection of an external device to the port 112-2 or 112-3 may require the control of the switches 216 to reconnect the hub 212 to the controller 204, thereby interrupting any connection established via the port 112-1. The connection established via the port 112-1 may then be re-established via the hub 212 (with the above-noted operational restrictions), but in the meantime data transfers, audio streams, or the like may fail and to need to be restarted.

As will be discussed below, the controller 204 is configured to implement an assessment process prior to establishing connections to external devices, in order to mitigate interruptions such as those noted above, while also enabling an enhanced operational mode for certain connections via the port 112-1 under some conditions.

Figure 3:
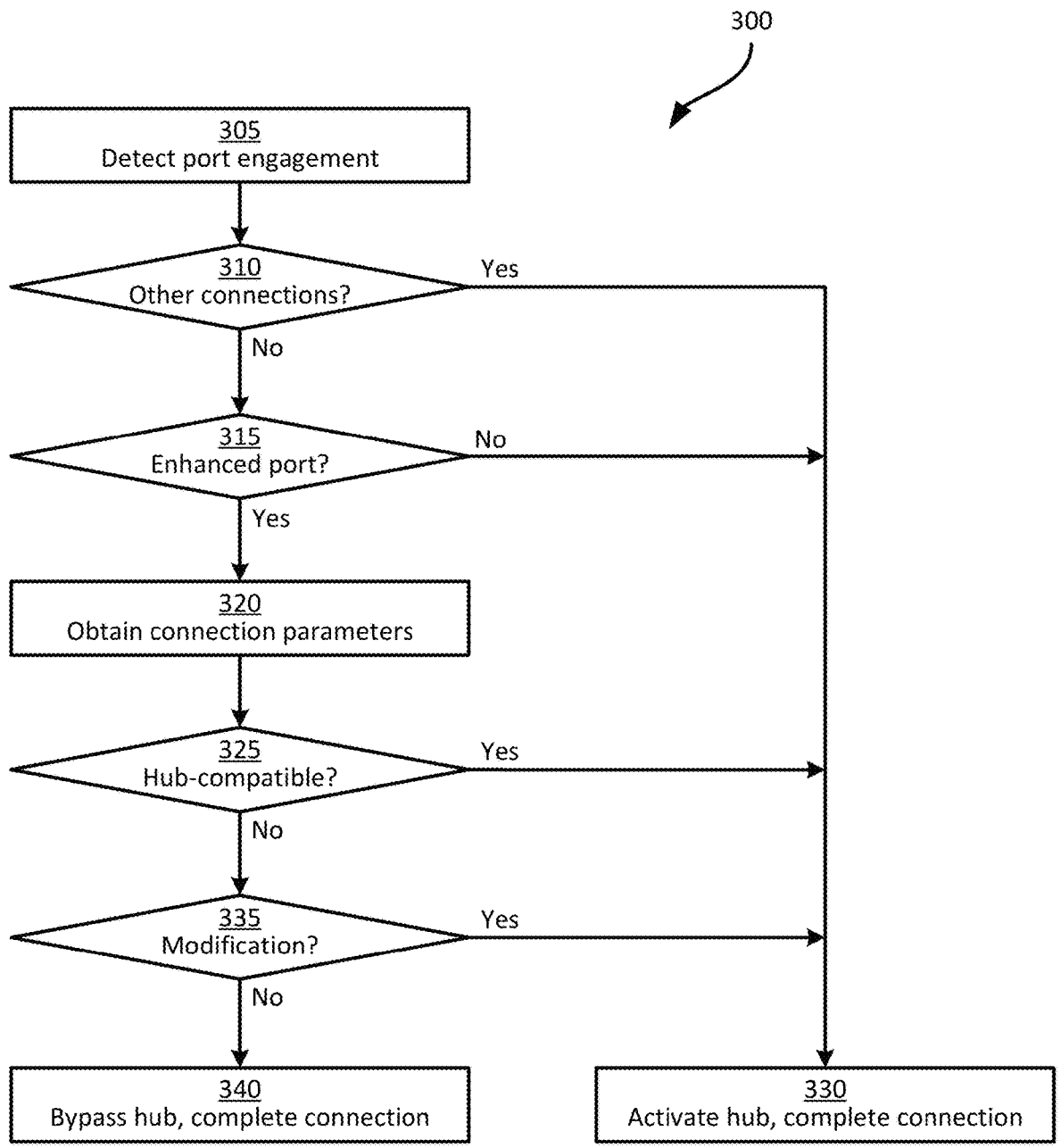
FIG. 3 is a flowchart of an example method of port sharing.

Turning to FIG. 3, a flowchart of a port-sharing method 300 is illustrated. The method 300 will be described in conjunction with its performance in the device 100, e.g., by the controller 204 to control operation of the port-sharing subsystem 208. As will be apparent, the method 300 may also be implemented in other devices 100, e.g., including different numbers of enhanced ports and restricted ports.

At block 305, the controller 204 is configured to detect engagement of an external device with one of the ports 112. Detection of engagement at block 305 can be done by detecting a predetermined voltage on one or more lines of the relevant port 112, as will be apparent to those skilled in the art. At block 305, the port-sharing subsystem 208 may be configured to connect the hub 212 to the controller 204, such that all ports 112 can be monitored for engagement. In some examples, detection of engagement at block 305 can also be implemented by querying a software-based state machine configured to track port connections, and/or by querying port drivers (e.g. integrated with an operating system) for port activity status.

Following the detection at block 305, at block 310 the controller 204 is configured to determine whether there are any other active connections to external devices. That is, the controller 204 is configured to determine whether any other ports 112 are currently engaged with external devices. When the determination at block 310 is affirmative (i.e., when one or more other ports 112 are already engaged with external devices), the controller 204 proceeds to establish a connection at the port detected at block 305 via the hub 212 (at block 330, discussed in greater detail below). Specifically, to support more than one concurrent connection, the hub 212 must be activated, and therefore an affirmative determination at block 310 necessitates use of the hub 212, regardless of any operational restrictions imposed thereby.

In the present example, it is assumed that the determination at block 310 is negative, because the engagement detected at block 305 is the only engagement present with any of the ports 112. The controller 204 therefore proceeds to block 315, and determines whether the engagement detected at block 305 is an engagement of an external device with the enhanced port 112-1. When the determination at block 315 is negative, as will be discussed below, the hub 212 is employed because the ports 112-2 and 112-3 are only connected to the controller 204 via the hub 212. However, in the present example performance of the method 300, the determination at block 315 is assumed to be affirmative. For example, turning to FIG. 4, a headset 400 is shown having been connected to the port 112-1. The ports 112-2 and 112-3, on the other hand, are inactive (i.e., no external devices are connected to the ports 112-2 and 112-3).

Figure 4:
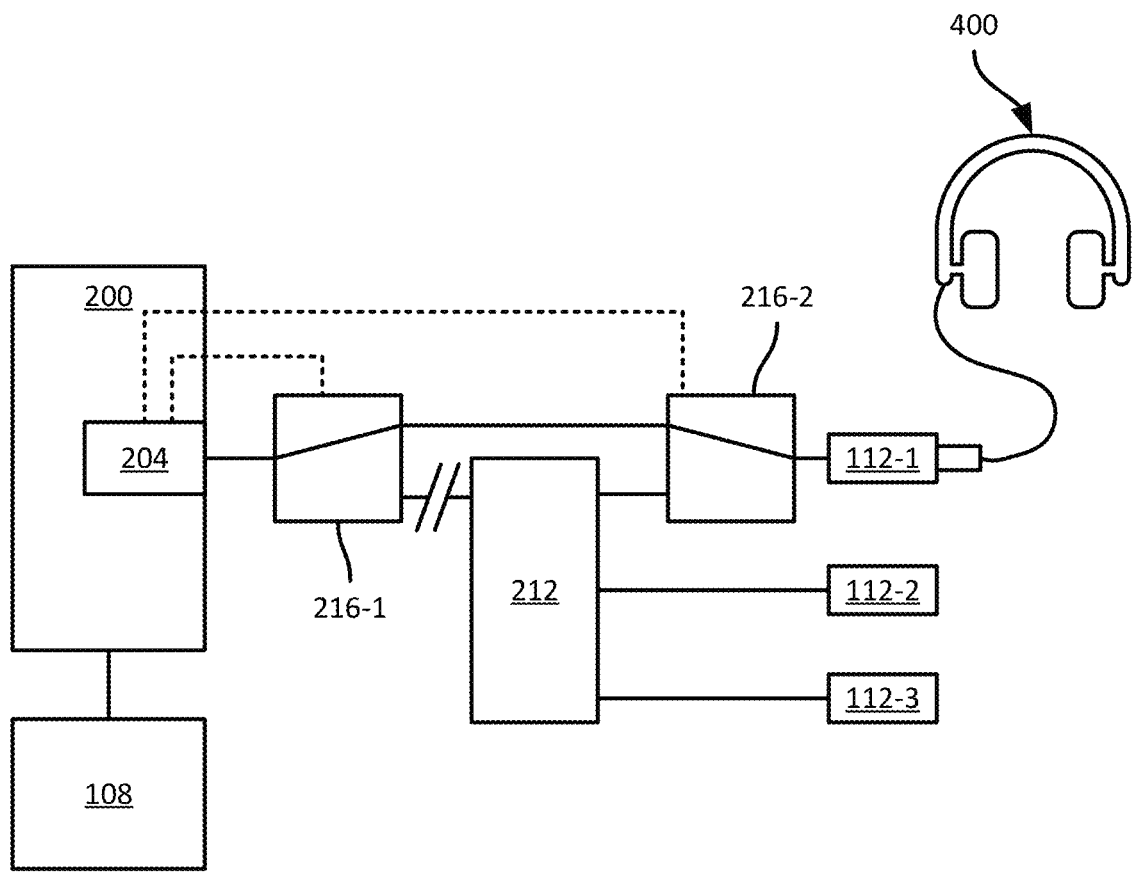
FIG. 4 is a diagram illustrating an example performance of blocks 305 to 320 of the method of FIG. 3.

Returning to FIG. 3, following an affirmative determination at block 315, the controller 204 proceeds to block 320. At block 320 the controller 204 obtains connection parameters for the external device, e.g., the headset 400 shown in FIG. 4. To obtain the connection parameters, the controller 204 can be configured to set the port-sharing subsystem 208 in a first state. The first state connects the port 112-1 to the controller 204, exclusively of the ports 112-2 and 112-3. As shown in FIG. 4, in the first state the switch 216-1 is controlled to connect the controller 204 to the second switch 216-2, and the second switch 216-2 is controlled to connect the port 112-1 to the first switch 216-1. Thus, the hub 212 is bypassed (i.e., not connected to the controller 204), and the port 112-1 is connected to the controller 204 exclusively. In the first state shown in FIG. 4, the port 112-1 can operate in an enhanced operating mode, in which the full set of functionality implemented by the controller 204 is available. However, prior to establishing a connection with the headset 400 in the illustrated state, the controller 204 is configured to assess whether such an exclusive connection is necessary to support the headset 400.

The connection parameters obtained at block 320 include, for example, a transfer speed and/or directionality for the connection. Various protocols(s) will occur to those skilled in the art to obtain the connection parameters, e.g., according to the USB enumeration process. For example, at block 320 the controller 204 may obtain connection parameters indicating that the headset 400 operates as a UFP device, indicating that the port 112-1 is to operate as a DFP. Further, the connection parameters obtained at block 320 indicate that the headset 400 supports FS and HS transfer speeds (e.g., excluding SS transfer speed). A variety of other connection parameters can also be obtained at block 320. For example, the controller 204 may obtain indications of whether the headset 400 (or any other connected device) supports any of a variety of connection modes supported by the controller 204, such as a display mode (e.g., Display Port over Type-C USB), and the like.

At block 325, the controller 204 is configured to determine whether the connection parameters obtained at block 320 are compatible with the hub 212. That is, the controller 204 is configured to determine whether, despite the engagement detected at block 305 being the only current port engagement, the engaged device can be supported via the hub 212 rather than via the dedicated connection established by bypassing the hub 212.

The determination at block 325 includes comparing the connection parameters from block 320 to stored connection parameters at the controller 204, representing the capabilities of the hub 212. For example, the controller 204 can store a maximum supported transfer speed, and/or support directionality parameters for the hub 212. In the present example, it is assumed that the hub 212 supports transfer speeds up to and including HS (i.e., excluding SS), and supports only DFP connections, in which the device 100 is the host. Thus, at block 325 the controller 204 determines that the connection parameters from block 320 are compatible with the hub 212.

Figure 5:
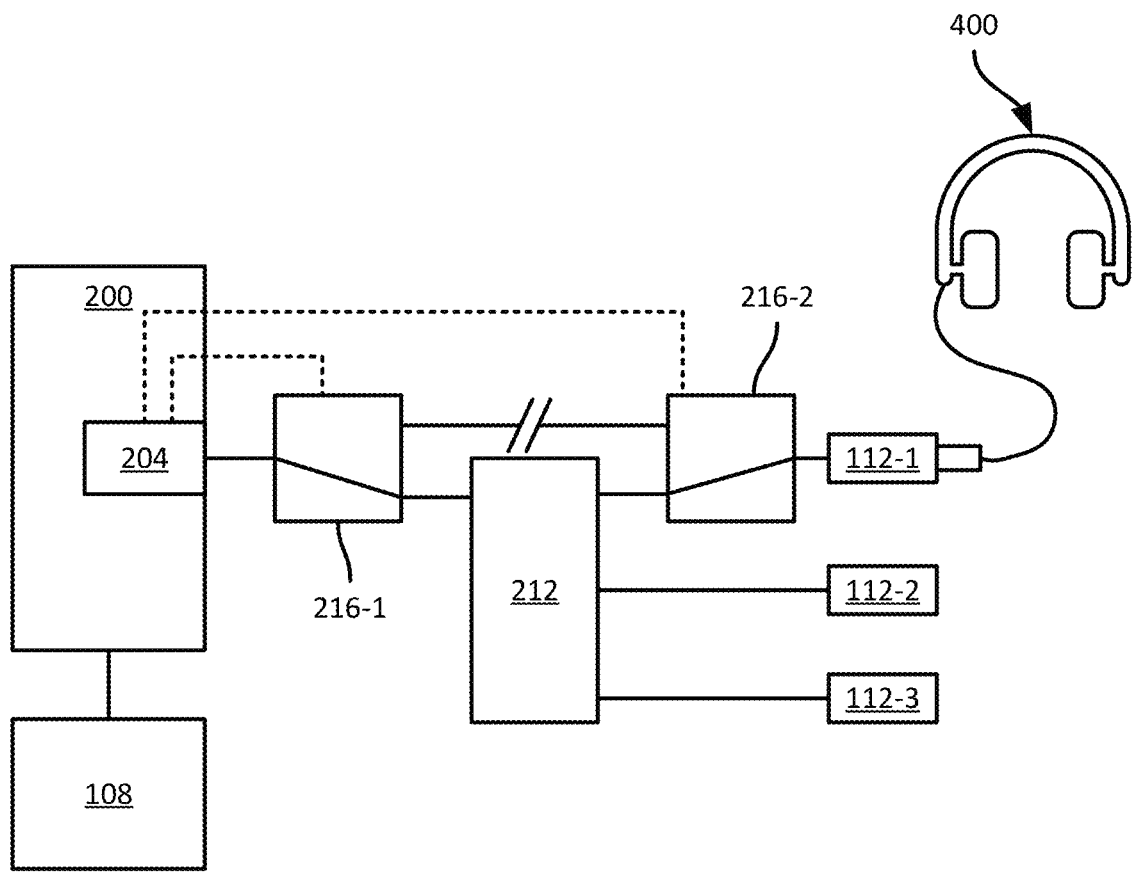
FIG. 5 is a diagram illustrating an example performance of blocks 325 and 330 of the method of FIG. 3.

Following an affirmative determination at block 325, the controller 204 proceeds to block 330. At block 330, the hub 212 is activated, and the connection with the headset 400 is completed. Completion of the connection with the headset 400 can include further enumeration processes, loading and execution of a driver for the headset 400, and the like. Referring to FIG. 5, the headset 400 is shown connected to the controller 204 via the hub 212. In FIG. 5, the port-sharing subsystem 208 is set to a second state to connect the controller 204 with the port 112-1 as well as the ports 112-2 and 112-3, via the hub. In the second state, the port-sharing subsystem 208 enables a restricted operational mode for the ports 112, due to restrictions in the functionality implemented by the hub 212 relative to the functionality implemented by the controller 204 (as well as the port 112-1). The port 112-1, in other words, is excluded from operating in an enhanced operational mode when the subsystem 208 is in the second state.

Figure 6:
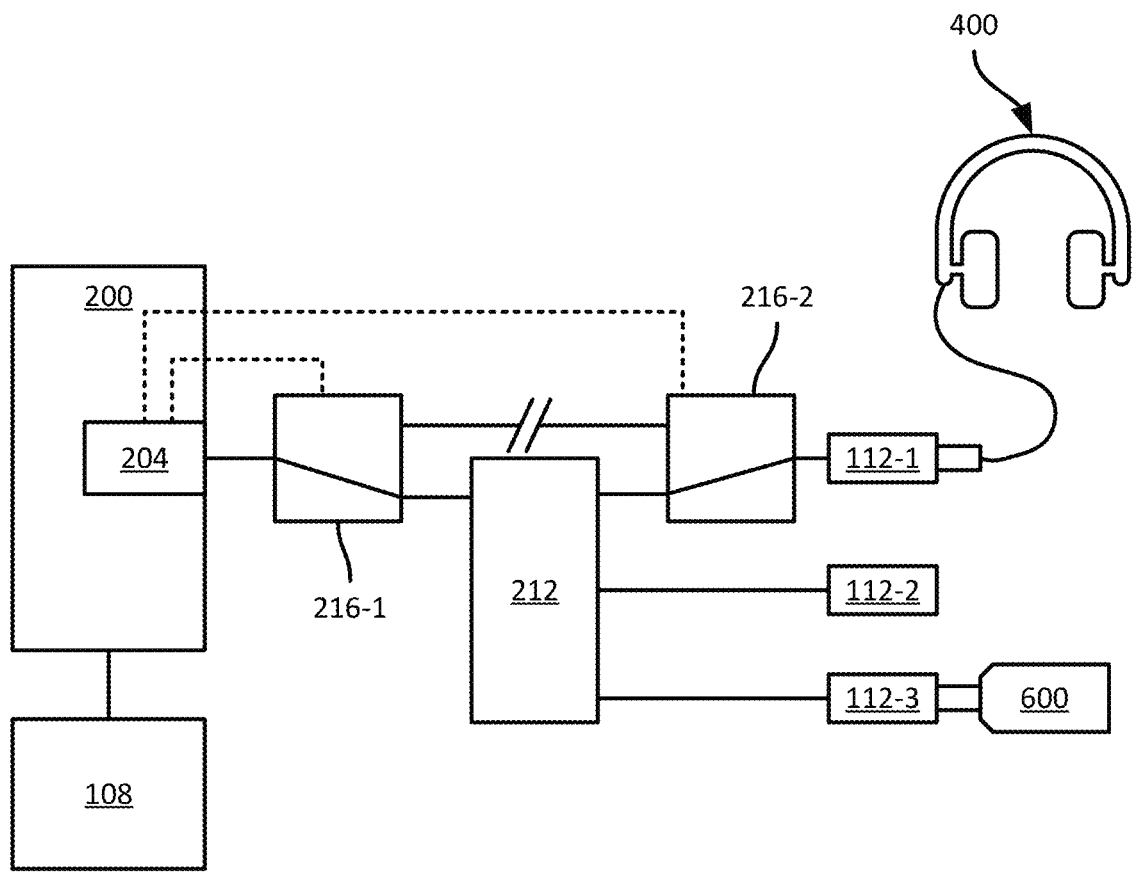
FIG. 6 is a diagram illustrating another example performance of the method of FIG. 3.

As will be apparent, subsequent engagements of other external devices may be detected through additional performances of block 305, triggering further performances of the method 300. Turning to FIG. 6, a thumb drive 600 or other external storage device has been engaged with the port 112-3. Thus, following a detection of the thumb drive 600 at another performance of block 305, the controller 204 determines, at block 310, whether other active connections are present. In this example, the determination at block 310 is affirmative, because the port 112-1 is also active. The controller 304 therefore proceeds directly to block 330, to complete a connection with the thumb drive 600 via the hub 212. As will now be apparent, connecting the thumb drive 600 via the hub 212 avoids interrupting the connection with the headset 400, because the headset 400 is also already connected via the hub 212. If the headset 400 had been connected by bypassing the hub 212, connection of the thumb drive 600 would require disconnection of the headset 400, and reconnection via the hub 212. Such a reconnection may result in a dropped audio stream or the like at the headset 400.

The assessment of connection parameters at block 325 therefore enables the controller 204 to set the port-sharing subsystem 208 in the second state for connections via the port 112-1 that are compatible with the restricted operating mode enabled in the second state. Using the second state in some cases, rather than simply connecting external devices at the port 112-1 using the first state regardless of the functional needs of those external devices, allows the controller 204 to reduce future disruptions to the connection at the port 112-1.

Figure 7:
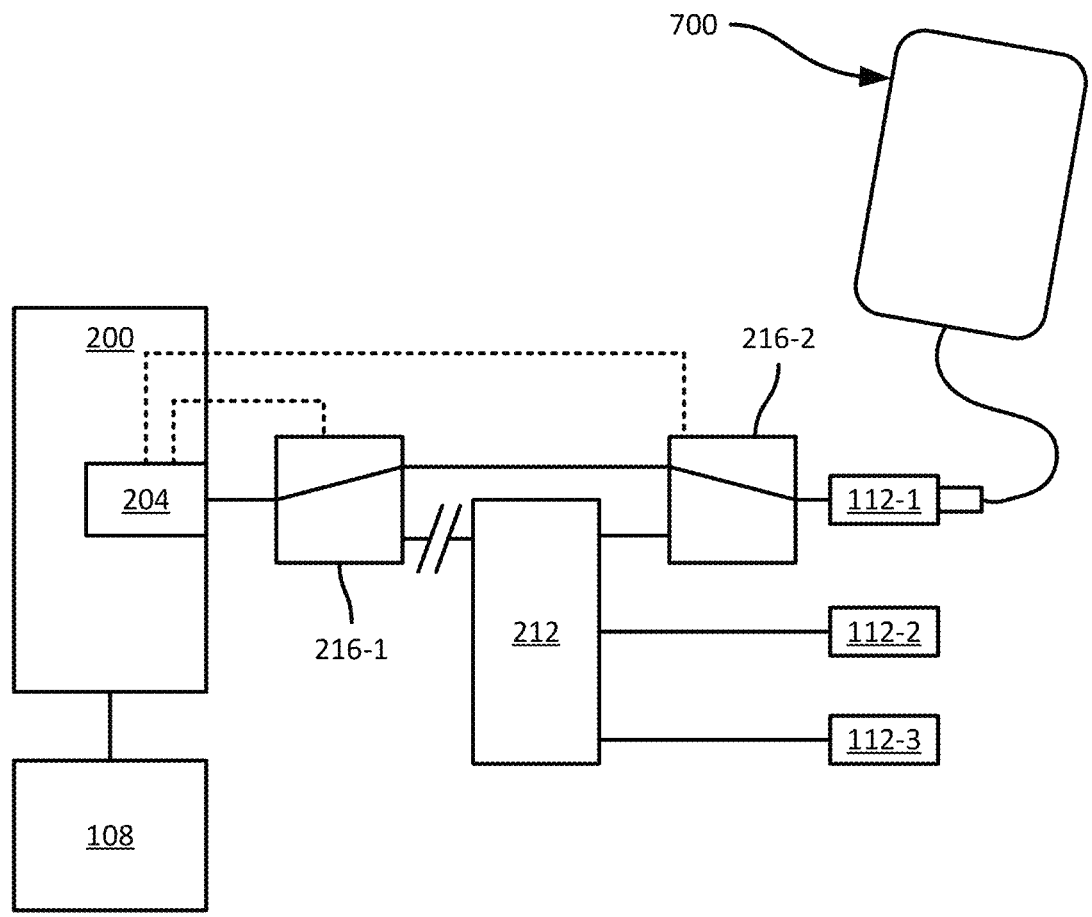
FIG. 7 is a diagram illustrating another example performance of the method of FIG. 3.

Turning to FIG. 7, a further example performance of the method 300 will be discussed, in which an external hard drive 700 is engaged with the port 112-1. Following detection of the hard drive 700 at block 305, the controller 204 makes a negative determination at block 310 (because no other ports 112 are active, as shown in FIG. 7), and an affirmative determination at block 315. At block 320, the controller 204 obtains connection parameters indicating that the hard drive 700 is a UFP device, such that the port 112-1 will operate as a DFP (host). Further, the connection parameters indicate that the maximum transfer speed supported by the hard drive 700 is SS. The determination at block 325 is therefore negative, because the hub 212 does not support the transfer speed specified in the connection parameters.

The controller 204 therefore proceeds to block 335, and determines whether to modify the connection parameters to parameters that are compatible with the hub 212. For example, the data stored by the controller 204 representing the capabilities of the hub 212 indicate that the hub 212 does support connections with the port 112-1 as a DFP. Further, because the connection parameters indicate that the hard drive 700 supports the SS transfer speed, the hard drive also supports lower transfer speeds, including those supported by the hub 212. Therefore, at block 335, the controller 204 can be configured to select modified connection parameters including DFP and a transfer speed compatible with the hub 212 (e.g., HS or FS). The controller 204 can then proceed to block 330 as noted above.

In some examples, prior to selecting modified connection parameters, at block 335 the controller 204 can generate a prompt via the display 108 requesting a command from an operator of the device 100 to modify the connection parameters or connect the hard drive 700 in the first state (i.e., in the enhanced operational mode).

Figure 8:
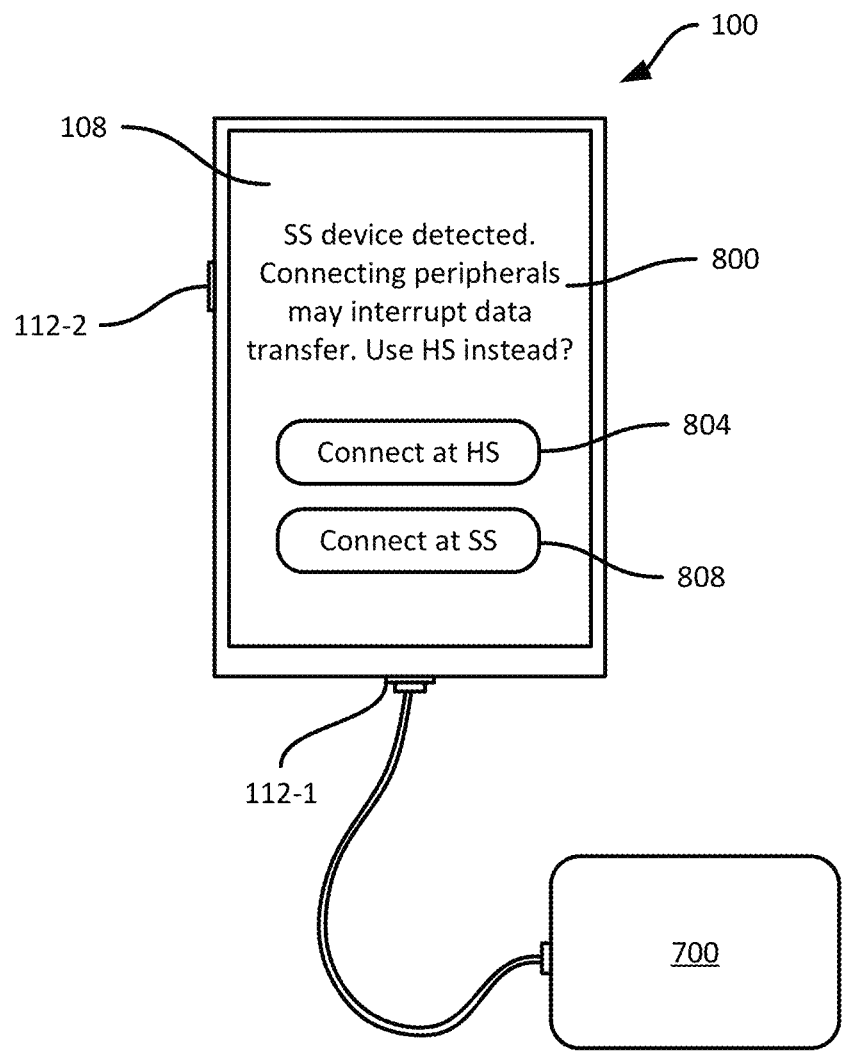
FIG. 8 is a diagram illustrating an example prompt rendered at block 335 of the method of FIG. 3.

Turning to FIG. 8, the display 108 is shown rendering a prompt, including a notification 800 (e.g., a string of text, although other notifications may also be employed in addition to or instead of the text shown in FIG. 8). The notification 800 indicates that the external device (i.e., the hard drive 700 in the illustrated example) operates at a given transfer speed (SS, in this example), and that operating the device at the specified transfer speed may interrupt the connection if other external devices are connected later. The prompt also includes selectable options 804 and 808, enabling the operator of the device 100 to connect the hard drive 700 at a reduced transfer speed (option 804), or to continue with the maximum transfer speed supported by the hard drive 700 (option 808).

If the option 804 is selected, the determination at block 335 is affirmative, and the controller 204 proceeds to connect the hard drive 700 via the hub 212, at a reduced transfer speed. That is, the controller 204 sets the port-sharing subsystem 208 to the second state, enabling a connection with the hard drive 700 in the restricted operational mode.

If the option 808 is selected, the determination at block 335 is negative, and the controller 204 proceeds to connect the hard drive 700 by bypassing the hub 212. That is, the controller 204 sets the port-sharing subsystem 208 to the first state, enabling a connection with the hard drive 700 in the enhanced operational mode. As will be apparent, the use of the first state may lead to interruptions in the connection with the hard drive 700 if another external device is connected to the port 112-2 or the port 112-3.

In other examples, the determination at block 335 may be made automatically by the controller 204. For instance, if a host computing device, such as a personal computer, is connected to the port 112-1, the determination at block 335 is negative, and the controller 204 may omit the generation of a prompt. The host computing device may specify in the connection parameters from block 320 that it operates as a DFP, meaning the port 112-1 must operate as a UFP. Because the hub 212 is incompatible with UFP operation, no modification is available.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:
   a housing defining an exterior of the computing device;
   a controller supported within the housing;
   a first communication port disposed on the exterior;
   a second communication port disposed on the exterior;
   a port-sharing subsystem supported within the housing, having (i) a first state to connect the controller with the first communication port, exclusive of the second communication port, and (ii) a second state to connect the controller with the first communication port and the second communication port in a restricted operational mode;
   the controller configured to:
   detect engagement of an external device with the first communication port;
   obtain connection parameters from the external device;
   modify the connection parameters of the external device so as to set the port-sharing subsystem to the second state where the controller is connected to the first communication port and the second communication port in the restricted operational mode;
   and
   establish a connection to the external device where the controller is connected to the first communication port and the second communication port.

2. The computing device of claim 1, wherein the controller includes a universal serial bus (USB) controller, and wherein the first and second communication ports are USB ports.

3. The computing device of claim 1, wherein the port-sharing subsystem includes a hub and at least one switch.

4. A method, comprising:
   detecting engagement of an external device with a first communication port disposed on an exterior of a computing device;
   configuring a port-sharing subsystem in either (i) a first state to connect the port-sharing subsystem with the first communication port, exclusive of a second communication port disposed on the exterior, or (ii) a second state to connect the port-sharing subsystem with the first communication port and the second communication port in a restricted operational mode;
   obtaining connection parameters from the external device;
   modifying the connection parameters of the external device so as to set the port-sharing subsystem to the second state where the port-sharing subsystem is connected to the first communication port and the second communication port in the restricted operational mode; and
   establishing a connection to the external device where the port-sharing subsystem is connected to the first communication port and the second communication port.

5. The method of claim 4, wherein the first and second communication ports are USB ports.

6. The method device of claim 4, wherein the port-sharing subsystem includes a hub and at least one switch.

* * * * *